US011155111B2

(12) United States Patent
Monnard et al.

(10) Patent No.: US 11,155,111 B2
(45) Date of Patent: Oct. 26, 2021

(54) COATING FORMULATION FOR DIGITAL PRINTING MEDIA

(71) Applicant: OMYA INTERNATIONAL AG, Oftringen (CH)

(72) Inventors: Fabien Wilhelm Monnard, Aarburg (CH); Jan Philipp Weihs, Düdingen (CH)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

(21) Appl. No.: 16/649,256

(22) PCT Filed: Sep. 24, 2018

(86) PCT No.: PCT/EP2018/075804
§ 371 (c)(1),
(2) Date: Mar. 20, 2020

(87) PCT Pub. No.: WO2019/063482
PCT Pub. Date: Apr. 4, 2019

(65) Prior Publication Data
US 2020/0282757 A1   Sep. 10, 2020

Related U.S. Application Data

(60) Provisional application No. 62/568,367, filed on Oct. 5, 2017.

(30) Foreign Application Priority Data

Sep. 28, 2017 (EP) ..................... 17193881

(51) Int. Cl.
| B41M 5/52 | (2006.01) |
| C09D 129/04 | (2006.01) |
| D21H 19/52 | (2006.01) |
| D21H 19/54 | (2006.01) |
| C09D 7/40 | (2018.01) |
| C09D 7/65 | (2018.01) |

(52) U.S. Cl.
CPC ........ *B41M 5/5254* (2013.01); *B41M 5/5218* (2013.01); *B41M 5/5236* (2013.01); *C09D 129/04* (2013.01); *C09D 7/40* (2018.01); *C09D 7/65* (2018.01); *D21H 19/52* (2013.01); *D21H 19/54* (2013.01)

(58) Field of Classification Search
CPC .... B41M 5/52; B41M 5/5254; B41M 5/5236; B41M 5/5218
USPC .......................................... 524/333
See application file for complete search history.

(56) References Cited

U.S. PATENT DOCUMENTS

| 3,057,811 | A | 10/1962 | Trachtenburg et al. |
| 3,107,259 | A * | 10/1963 | Schwarzenbach ..... C08G 79/00 534/16 |
| 3,501,424 | A * | 3/1970 | Kyoichiro .............. D21H 21/00 524/45 |
| 4,419,388 | A | 12/1983 | Sugiyama et al. |
| 4,694,302 | A | 9/1987 | Hackleman et al. |
| 4,830,911 | A | 5/1989 | Kojima et al. |
| 5,206,071 | A | 4/1993 | Atherton et al. |
| 6,605,142 | B1 | 8/2003 | Kenworthy et al. |
| 2004/0070654 | A1 * | 4/2004 | Taguchi ............... C09D 11/328 347/100 |
| 2010/0221460 | A1 | 9/2010 | Wexler et al. |
| 2011/0104407 | A1 | 5/2011 | Zhou |
| 2012/0105548 | A1 | 5/2012 | Irving et al. |
| 2013/0095333 | A1 | 4/2013 | Pal et al. |
| 2013/0176371 | A1 | 7/2013 | Nagoshi et al. |

FOREIGN PATENT DOCUMENTS

| EP | 1712597 A1 | 10/2006 |
| EP | 1712523 A1 | 11/2006 |
| EP | 2371766 A1 | 10/2011 |
| EP | 2447213 A1 | 5/2012 |
| EP | 2524898 A1 | 11/2012 |
| WO | 2013/142473 A1 | 9/2013 |
| WO | WO-2016073565 A1 * | 5/2016 ............. C08L 77/02 |

OTHER PUBLICATIONS

International Search Report from PCT/EP2018/075804, dated Oct. 24, 2018, 3 pages.
Written Opinion from PCT/EP2018/075804, dated Oct. 24, 2018, 5 pages.
Souaya et al. (2000) "Studies on Some Acid Divalent-Metal Nitrilotriacetate Complexes" Molecules, vol. 5, pp. 1121-1129.

* cited by examiner

*Primary Examiner* — Deve V Hall
(74) *Attorney, Agent, or Firm* — ALGM LLP; Harry J. Guttman

(57) ABSTRACT

The present invention relates to a coating formulation for digital printing media comprising a polymeric binder and a solid metal complex, wherein said solid metal complex comprises (i) a divalent or trivalent metal cation and (ii) a polydentate ligand. The invention further relates to a method for preparing the inventive coating formulation, to a digital printing medium comprising the inventive coating and a method for preparing same, and to corresponding uses.

26 Claims, 2 Drawing Sheets

COATING FORMULATION FOR DIGITAL PRINTING MEDIA

CROSS-REFERENCE TO RELATED APPLICATIONS

This application is a National Stage Entry of International Application No. PCT/EP2018/075804 filed Sep. 24, 2018, entitled "COATING FORMULATION FOR DIGITAL PRINTING MEDIA", and which claims the benefit of U.S. Provisional Application No. 62/568,367, filed Oct. 5, 2017 entitled "COATING FORMULATION FOR DIGITAL PRINTING MEDIA" and which also claims priority to EP Application No 17193881.4 filed Sep. 28, 2017 entitled "COATING FORMULATION FOR DIGITAL PRINTING MEDIA."

The present invention relates to a coating formulation for digital printing media comprising a polymeric binder and a solid metal complex, wherein said solid metal complex comprises (i) a divalent or trivalent metal cation and (ii) a polydentate ligand. The invention further relates to a method for preparing the inventive coating formulation, to a digital printing medium comprising the inventive coating formulation and a method for preparing same, and to corresponding uses thereof.

Digital printers, such as inkjet printers, offer a flexible, low cost and high quality option to other types of printers commonly used with computers. Printing media useful in digital printing include coated or uncoated cardboard or paper substrates, polymer-based substrates, textile-based substrate as well as substrates based on natural materials such as wooden substrates.

The print medium should absorb ink well and should be free from bleeding of the deposited image. At the same time, the medium should also be capable of accepting high resolution dots (i.e. small dots) with relatively large volumes of ink (i.e. high density dots). As a consequence, lateral diffusion of ink dots should be small even at high ink loadings.

In order to satisfy these needs, printing substrates are provided in the art that have a coating layer comprising a binder and, optionally, a pigment, wherein the coating layer acts as an ink receptive layer. One method for improving the imaging output was to immobilize the ink on the paper coating by incorporating a cationic polymer or other additives in the paper coating. Metal salts were also used in the past for the same purpose.

For example, U.S. Pat. No. 4,694,302 discloses a print method for increasing the print quality by applying a reactive species that binds the ink dye to the paper substrate by forming a polymer. Said species is applied to the print medium either before or after printing the ink.

In a similar manner, U.S. Pat. No. 4,830,911 employs a cationic water-soluble polymer coating applied, after an aqueous ink has been printed, to improve ink fixation.

U.S. Pat. No. 4,419,388 discloses an increase in water fastness by applying a treatment of various mixed metal sulfates or selenates to the surface of the paper after the image has been recorded.

U.S. Pat. No. 5,206,071 uses a water insoluble high molecular weight quaternary ammonium salt to reduce bleeding at high humidity.

The use of metal salts as additives in conventional coating compositions for improving ink absorption and fixation is disclosed in US 2013/0176371 A1. More specifically, a coated printing paper is disclosed which comprises a base paper and on at least one surface of the base paper, a coating layer containing a pigment and a binder as main components, wherein said coating layer contains ground calcium carbonate as a pigment and the base paper and/or the coating layer contains an additional calcium compound other than calcium carbonate, wherein the content of calcium derived from said calcium compound is 3 to 60 mmol in terms of calcium ions per 1 $m^2$ of the base paper and/or the coating layer.

The concept of adding cationic fixation agents has lead to improvements in terms of ink fixation. The costs of using metal salts, such as calcium chloride, is also comparably low. However, the inventors of the present invention have found that the presence of metal cations may lead to a significant increase of the viscosity of the coating formulation. In turn, the increase in coating viscosity may result in reduced paper coating performance (e.g. coating speed) or reduced quality of the coating on the substrate (e.g. unevenness). To overcome these drawbacks, the total solids content of the coating formulation should be reduced which, however, may again lead to a loss in coating quality (e.g. reduced thickness).

In view of the above, there is still a need for the provision of coating formulations and corresponding methods which overcome one or more of these drawbacks.

Therefore, one object of the present invention may be seen in the provision of a coating formulation which has improved ink fixation properties.

Another object of the present invention may be seen in the provision of a coating formulation which has an increased solids content, e.g. an increased content of inorganic pigments.

Still another object may be seen in the provision of a coating formulation having a lower viscosity.

Accordingly, still another object of the present invention may be seen in the provision of a coating formulation having an increased solids content and/or with improved ink fixation properties while, at the same time, the viscosity of the formulation should be in a range that allows for a good coating performance and a good coating quality.

Furthermore, one object of the present invention may be seen in the provision of a coating formulation, that leads to good or improved printing results, e.g. in terms of image resolution or ink density, preferably in combination with one or more of the aforementioned objects.

The foregoing and other problems may be solved by the subject-matter as defined herein in the independent claims.

A first aspect of the present invention relates to a coating formulation for digital printing media comprising a polymeric binder and a solid metal complex having a solubility in water of less than 25 g/l at 23° C. determined according to ISO 787-3:2000, said solid metal complex comprising:
 (i) a divalent or trivalent metal cation; and
 (ii) a polydentate ligand;
 characterized in that the polydentate ligand is a molecule of general Formula I or a corresponding anion:

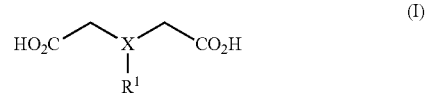

(I)

wherein
X is N, C—H or C—OH; and
$R^1$ is selected from —$CO_2H$ or —$CH(R^2)CO_2H$, wherein $R^2$ is H or a substituted or unsubstituted alkyl, preferably H or a substituted or unsubstituted $C_1$ to $C_5$ alkyl, and most preferably H or a substituted or unsubstituted $C_1$ alkyl, wherein the polydentate ligand is nitrilotriacetic acid or a corresponding anion.

The inventors surprisingly found that the use of a metal complex comprising (i) a divalent or trivalent metal cation and (ii) a polydentate ligand of general Formula I or a corresponding anion in paper coating compositions leads to a significant reduction of the viscosity. While not wishing to be bound by any theory, it is believed that the specific ligand design leads to the formation of a solid complex wherein the coordination sites of the divalent or trivalent metal cation are only partially occupied. As a result, the ink fixation capacity is significantly increased while, at the same time, viscosity remains comparably low.

Another aspect of the present invention relates to a method for preparing said coating formulation, the method comprising the following steps:
(a) providing a polymeric binder;
(b) providing a solid metal complex having a solubility in water of less than 25 g/l at 23° C. determined according to ISO 787-3:2000, said solid metal complex comprising:
    (i) a divalent or trivalent metal cation; and
    (ii) a polydentate ligand;
(c) mixing the polymeric binder provided in step (a) with the solid metal complex provided in step (b) and, optionally, with an inorganic pigment;
characterized in that the polydentate ligand is a molecule of general Formula I or a corresponding anion:

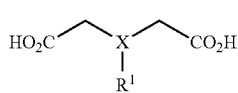

(I)

wherein

X is N, C—H or C—OH; and $R^1$ is selected from —$CO_2H$ or —$CH(R^2)CO_2H$, wherein $R^2$ is H or a substituted or unsubstituted alkyl, preferably H or a substituted or unsubstituted $C_1$ to $C_5$ alkyl, and most preferably H or a substituted or unsubstituted $C_1$ alkyl, wherein the polydentate ligand is nitrilotriacetic acid or a corresponding anion.

Still another aspect of the present invention relates to a method for preparing a digital printing medium, the method comprising the following steps:
(a) providing a printable substrate having at least one printable surface;
(b) providing the inventive coating formulation;
(c) applying the coating formulation provided in step (b) onto said at least one printable surface of the printable substrate provided in step (a).

Still another aspect of the present invention relates to a digital printing medium obtainable by the inventive method.

Still another aspect of the present invention relates to the use of the inventive digital printing medium in digitally printed paper products or digitally printed cardboard products such as stickers, labels, tags, tickets, posters, wallpapers, documents, passports, identification cards, banknotes or postage stamps, and in digitally printed textile products such as garments or curtains.

The following terms used in this document shall have the meanings as set forth hereinafter:

In the meaning of the present invention a "metal complex" comprises a central metal cation, which is called the coordination centre, and a surrounding array of one or more bound molecules or corresponding anions, which are called ligands. The bonds between the coordination centre of a complex and its ligands are often referred to as coordinate covalent bonds, dative bonds, or coordinate bonds.

A "divalent metal cation" in the meaning of the present invention is a metal ion that carries a positive charge of +2, for example $Ca^{2+}$. Accordingly, a "trivalent metal cation" is a metal ion that carries a positive charge of +3, for example $Al^{3+}$.

A "ligand" in the meaning of the present invention is any molecular entity or corresponding anion that is capable of forming a complex with a suitable coordination centre, e.g. with a metal cation. A "polydentate ligand" is a ligand that is able to bind through two (bidentate) or more (tridentate etc.) so-called donor sites (typically lone pairs).

Unless specified otherwise, the brightness referred to herein is the ISO brightness R457 indicated in % and can be determined as described in the experimental section hereinbelow.

In the present context, the term "printable substrate" is to be understood as any material having a surface suitable for printing such as cardboard, paper, polymer substrates, textile-based substrates or wooden substrates. The mentioned examples are, however, not of limitative character.

A "suspension" or "slurry" comprises insoluble solids and a liquid (preferably water), and optionally further additives, and usually contains large amounts of solids and, thus, is more viscous and can be of higher density than the liquid from which it is formed.

A "solution" as referred to herein is understood to be a single phase mixture of a specific solvent and a specific solute, for example a single phase mixture of a salt and water. The term "dissolved" as used herein thus refers to the physical state of a solute in a solution.

The term "solid" according to the present invention refers to a material that is solid under standard ambient temperature and pressure (SATP) which refers to a temperature of 298.15 K (25° C.) and an absolute pressure of exactly 1 bar. The solid may be in the form of a powder, tablet, granules, flakes etc. Accordingly, the term "liquid" refers to a material that is liquid under standard ambient temperature and pressure (SATP) which refers to a temperature of 298.15 K (25° C.) and an absolute pressure of exactly 1 bar.

The "particle size" of the inorganic pigment used in the coating formulation of the present invention may be defined by the weight-based particle size distribution $d_x(wt)$. Therein, the value $d_x(wt)$ represents the diameter relative to which x % by weight of the particles have diameters less than $d_x(wt)$. This means that, for example, the $d_{20}(wt)$ value is the particle size at which 20 wt % of all particles are smaller than that particle size. The $d_{50}(wt)$ value is thus the weight median particle size, i.e. 50 wt % of all particles are smaller than that particle size and the $d_{98}(wt)$ value, referred to as weight top cut, is the particle size at which 98 wt % of all particles are smaller than that particle size.

The "particle size" of the solid metal complex used in the inventive coating formulation may be defined by the volume-based particle size distribution $d_x(vol)$.

The value $d_x(vol)$ represents the diameter relative to which x % by volume of the particles have diameters less than $d_x(vol)$. This means that, for example, the $d_{20}(vol)$ value is the particle size at which 20 vol % of all particles are smaller than that particle size. The $d_{50}$(vol) value is thus the volume median particle size, i.e. 50 vol % of all particles are smaller than that particle size and the $d_{98}$(vol) value, referred to as volume top cut, is the particle size at which 98 vol % of all particles are smaller than that particle size.

A "dry" or "dried" material may be defined by its total moisture content which, unless specified otherwise, is less than or equal to 15 wt %, preferably less than or equal to 10 wt %, more preferably less than or equal to 5 wt %, even more preferably less than or equal to 1 wt %, and most preferably between 0.05 and 0.5 wt %, based on the total weight of the dried material.

Where an indefinite or definite article is used when referring to a singular noun, e.g. "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising".

If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Advantageous embodiments of the inventive use of the particulate solid carrier are defined in the corresponding dependent claims.

In a first embodiment, the solid metal complex has an ISO brightness R457(%) of at least 80, preferably at least 85, more preferably at least 90, still more preferably at least 92, and most preferably at least 95.

In another embodiment according to the present invention, the coating formulation is a coating formulation for inkjet printing media or flexographic printing media, preferably inkjet printing media.

In still another embodiment, the solid metal complex is obtainable by a process comprising the following steps:
  (a) providing a metal salt comprising said divalent or trivalent metal cation and a counter anion;
  (b) providing said polydentate ligand;
  (c) contacting the metal salt provided in step (a) and the polydentate ligand provided in step (b) to obtain a mixture;
  (d) precipitating the solid metal complex from the mixture obtained in step (c);
wherein said metal salt provided in step (a) and/or said polydentate ligand provided in step (b) preferably is/are provided in the form of an aqueous preparation, more preferably in the form of an aqueous solution.

In still another embodiment, the solid metal complex used in the coating formulation is obtainable by a process as defined in the previous embodiment, wherein said process further comprises a step of increasing the pH value of the mixture obtained in step (c) by adding a base, preferably before and/or during precipitating step (d), most preferably before precipitating step (d).

In still another embodiment, the metal cation is a divalent metal cation, preferably an alkaline earth metal cation.

In still another embodiment, the metal cation of the solid metal complex is selected from the group consisting of $Al^{3+}$, $Ba^{2+}$, $Cr^{3+}$, $Ca^{2+}$, $Cd^{2+}$, $Fe^{3+}$, $Mg^{2+}$, $Pb^{2+}$, $Sr^{2+}$, $Zn^{2+}$, and $Zr^{2+}$, preferably the metal cation is $Ca^{2+}$, $Mg^{2+}$ or $Zn^{2+}$, and most preferably $Ca^{2+}$.

In still another embodiment according to the present invention, the polymeric binder is selected from the group consisting of starch, modified starch, modified cellulose, proteins and synthetic polymers, preferably starch, carboxymethyl cellulose, casein, a styrene-butadiene-based copolymer or polyvinyl alcohol, and most preferably polyvinyl alcohol.

In still another embodiment, the coating formulation has a Brookfield viscosity in the range of from 250 to 5 000 mPa·s, more preferably from 300 to 3 000 mPa·s, still more preferably from 400 to 2 500 mPa·s, and most preferably from 700 to 2 000 mPa·s.

In another embodiment according to the present invention, the formulation has the following composition, based on the total solids content of the formulation:
  0.1 to 60 wt % of the solid metal complex;
  0.1 to 60 wt % of the polymeric binder;
  optionally 0.01 to 10 wt % of one or more additives;
  wherein the solid metal complex, the polymeric binder and the additives add up to 100 wt %, based on the total solids content of the formulation.

In another embodiment, the coating formulation further comprises an inorganic pigment, preferably a calcium carbonate-containing pigment.

In still another embodiment, the inventive coating formulation further comprises an inorganic pigment, preferably a calcium carbonate-containing pigment, wherein the formulation has the following relative composition:
  100 parts by weight of inorganic pigment,
  0.1 to 30 parts by weight of the solid metal complex;
  0.1 to 20 parts by weight of the polymeric binder;
  optionally 0.001 to 20 parts by weight of one or more additives.

In still another embodiment of the present invention, the coating formulation has a total solids content in the range of from 25 to 85 wt %, preferably from 35 to 75 wt %, and most preferably from 50 to 72 wt %, based on the total weight of the coating formulation.

In one embodiment of the method for preparing the coating formulation according to the present invention, the solid metal complex has an ISO brightness R457(%) of at least 80, preferably at least 85, more preferably at least 90, still more preferably at least 92, and most preferably at least 95.

In another embodiment of the present invention, said method further comprises the following process for preparing the solid metal complex:
  (a) providing a metal salt comprising said divalent or trivalent metal cation and a counter anion;
  (b) providing said polydentate ligand;
  (c) contacting the metal salt provided in step (a) and the polydentate ligand provided in step (b) to obtain a mixture;
  (d) precipitating the solid metal complex from the mixture obtained in step (c);
wherein said metal salt provided in step (a) and/or said polydentate ligand provided in step (b) preferably is/are provided in the form of an aqueous preparation, more preferably in the form of an aqueous solution.

In a preferred embodiment of the inventive method, said metal salt is a water-soluble metal salt.

In another preferred embodiment of the inventive method, the counter anion of the metal salt is a monovalent or divalent anion, preferably a monovalent anion, more preferably an anion selected from the group consisting of $Br^-$, $Cl^-$, $I^-$ and $NO_3^-$, even more preferably an anion selected from $Cl^-$ and $NO_3^-$, and most preferably the counter anion is $Cl^-$.

In another preferred embodiment of the inventive method, the process for preparing the solid metal complex further comprises a step of increasing the pH value of the mixture obtained in step (c) by adding a base, preferably before and/or during precipitating step (d), most preferably before precipitating step (d).

In another preferred embodiment of the inventive method, the process for preparing the solid metal complex further comprises a step of drying the solid metal complex obtained in precipitating step (d).

In another preferred embodiment of the inventive method, the process for preparing the solid metal complex further comprises a step of grinding the solid metal complex obtained in precipitating step (d).

In one embodiment of the method for preparing a corresponding digital printing medium, the coating formulation is applied onto said at least one printable surface by using a blade coater, a curtain coater, a rod coater or a size press, preferably a blade coater.

In another embodiment, the printable substrate is a precoated or uncoated cardboard substrate, a precoated or uncoated paper substrate, a polymer substrate, a textile-based substrate or a wooden substrate, preferably a precoated or uncoated cardboard or paper substrate, and most preferably a precoated or uncoated paper substrate.

In the following, details and preferred embodiments of the inventive coating formulation will be disclosed. It is to be understood that these details and embodiments also apply to the method for preparing the inventive coating formulation, the method for preparing a corresponding digital printing medium, the digital printing medium as such, as well as to the uses of said solid digital printing medium.

(A) The Polymeric Binder

The coating formulation according to the present invention comprises a polymeric binder. Polymeric binders are generally known to the skilled person and are widely used in paper coatings.

The inventive coating formulation may comprise any conceivable type of polymeric binders known in the art including synthetic, natural or modified natural polymers.

More specifically, binders useful for the purpose of the present invention may be selected from synthetic binders such as polyvinyl pyrrolidone (PVP), polyethylene glycol (PEG), polyvinyl alcohols (PVAs), polymethacrylates and styrene-butadiene-based copolymers (e.g. carboxylated styrene-butadiene copolymers); natural polymers such acacia gum, tragacanth gum, sandarac gum, ghatti gum, karaya gum, locust bean gum, guar gum, gelatin, casein, collagen, starch and its derivatives, inulin, cellulose, pectins, carrageenans, shellac and alginic acid; modified natural polymers such as methylcellulose (MC), ethylcellulose (EC), carboxymethylcellulose (CMC), hydroxypropyl methylcellulose (HPMC), hydroxypropylcellulose (HPC) and ethylhydroxyethylcellulose (EHEC); and mixtures of any of the foregoing binders.

In one embodiment according to the present invention, the polymeric binder is selected from the group consisting of starch, modified starch, modified cellulose, proteins and synthetic polymers.

Preferred polymeric binders in the meaning of the present invention are starch, carboxymethyl cellulose, casein, styrene-butadiene-based copolymers and polyvinyl alcohol.

In a particularly preferred embodiment, the polymeric binder of the present invention is polyvinyl alcohol, wherein fully hydrolyzed (degree of hydrolysis ≥95%) polyvinyl alcohols may be most preferred.

The amount of polymeric binder used in the inventive coating formulation may vary depending on the specific needs. In particular, the total amount of polymeric binder in the coating formulation or the ratio relative to the remaining ingredients may be varied to adjust the viscosity of the coating formulation.

In one embodiment, the coating formulation has the following composition, based on the total solids content of the formulation:
  0.1 to 60 wt %, preferably 2 to 55 wt % of the solid metal complex;
  0.1 to 60 wt %, preferably 2 to 55 wt % of the polymeric binder;
  wherein the solid metal complex and the polymeric binder add up to 100 wt %, based on the total solids content of the formulation; and
  wherein the coating formulation preferably has a total solids content in the range of from 25 to 85 wt %, more preferably from 35 to 75 wt %, and most preferably from 50 to 72 wt %, based on the total weight of the coating formulation.

(B) The Metal Complex

As a further component, the coating formulation of the present invention comprises a solid metal complex, wherein the complex has a solubility in water of less than 25 g/l at 23° C. determined according to ISO 787-3:2000.

The metal complex is a solid metal complex, meaning that the complex in isolated form is solid (e.g. an amorphous or crystalline powder) under standard ambient temperature and pressure (SATP) which refers to a temperature of 298.15 K (25° C.) and an absolute pressure of exactly 1 bar.

In some embodiments, the solid metal complex may have a specific ISO brightness R457(%). Unless specified otherwise, the brightness refers to the brightness of the solid metal complex in isolated form (e.g. in the form of an amorphous or crystalline powder). The corresponding measuring method is described in the experimental section hereinbelow.

In one embodiment of the present invention, the solid metal complex has an ISO brightness R457(%) of at least 80, preferably at least 85, more preferably at least 90, still more preferably at least 92, and most preferably at least 95.

Solid materials having a brightness as specified above may be referred to as "white" materials depending on the specific brightness, in particular if the brightness is 92 or higher. In this regard, the coating formulation of the present invention is particularly suitable for use in combination with white pigments, such as calcium carbonate pigments. Such pigments may be contained as an additional component in the inventive coating formulation and/or they may be present as a component on the printable substrate (e.g. as a filler pigment, or in an additional precoating) to which the inventive coating is applied.

It has been found, surprisingly, that metal complexes having a low solubility in water are particularly useful in order to increase the desired ink fixation capacity while, at the same time, keeping the viscosity within an acceptable range, for example in a range of from 250 to 5 000 mPa·s, depending on the total solids content. Water-soluble metal complexes thus may be less suitable as they were found to reduce the viscosity strongly.

The metal complexes used in the coating formulation of the present invention have a solubility in water of less than 25 g/l at 23° C. In a preferred embodiment, the metal complexes have a solubility in water of less than 20 g/l at 23° C., and most preferably less than 18 g/l at 23° C. Solubilities are determined according to ISO 787-3:2000.

The amount of the solid metal complex in the inventive coating formulation may vary depending on the specific needs or the coating method. In particular, the amount of solid metal complex or the ratio relative to the remaining ingredients may be varied to adjust the viscosity of the coating formulation.

In one embodiment, the coating formulation has the following composition, based on the total solids content of the formulation:
- 0.1 to 60 wt %, preferably 2 to 55 wt % of the solid metal complex;
- 0.1 to 60 wt %, preferably 2 to 55 wt % of the polymeric binder;
- wherein the solid metal complex and the polymeric binder add up to 100 wt %, based on the total solids content of the formulation; and
- wherein the coating formulation has a total solids content in the range of from 25 to 85 wt %, preferably from 35 to 75 wt %, and most preferably from 50 to 72 wt %, based on the total weight of the coating formulation.

As already explained hereinabove, the metal complex of the present invention comprises a central metal cation. According to the present invention, the metal cation is a divalent or trivalent metal cation.

In a preferred embodiment, the metal cation is a divalent metal cation, preferably an alkaline earth metal cation such as $Ca^{2+}$ or $Mg^{2+}$.

In still another embodiment, the metal cation is selected from the group consisting of $Al^{3+}$, $Ba^{2+}$, $Cr^{3+}$, $Ca^{2+}$, $Cd^{2+}$, $Fe^{3+}$, $Mg^{2+}$, $Pb^{2+}$, $Sr^{2+}$, $Zn^{2+}$, and $Zr^{2+}$, preferably the metal cation is $Ca^{2+}$, $Mg^{2+}$ or $Zn^{2+}$, and most preferably $Ca^{2+}$.

The ligand of the solid metal complex is a polydentate ligand, meaning that it has two or more donor sites that are capable of forming coordinate covalent bonds with the central metal cation. The ligand of the present invention is nitrilotriacetic acid or a corresponding anion.

The skilled person is well familiar with the concept of molecules and corresponding anions. Such anions may be formed by deprotonation, i.e. the removal of one or more protons ($H^+$), depending on the acidity of the corresponding protons and the surrounding pH. The skilled person will recognize that increasing the pH may facilitate deprotonation and the formation of corresponding anions. In the meaning of the present application the term "corresponding anion" is meant to refer to both, partially and fully deprotonated forms, wherein e.g. the latter means that all acidic protons present in the molecule of general Formula I are removed. For example, acidic protons are those present in carboxylic groups —$CO_2H$.

Where in this document reference is made to unsubstituted alkyls, this shall include linear, branched as well as cyclic unsubstituted alkyl radicals if applicable, e.g. linear $C_3$ (n-propyl), cyclic $C_3$ (cyclopropyl) and branched $C_3$ (iso-propyl). The same applies analogously to substituted alkyls, wherein the substituent may be located at any conceivable position. The skilled person is well familiar with the term "substituted" meaning that one or more hydrogens (—H) of a alkyl group are replaced by a functional group, such as —OH, —F, —Cl, —Br, —$CO_2H$ etc. In any of the embodiments according to the present invention, the substituted alkyl preferably is a monosubstituted alkyl.

In another preferred embodiment, the ligand is thus a molecule of general Formula I as shown above or a corresponding anion, wherein $R^1$ is selected from —$CO_2H$ or —$CH(R^2)CO_2H$ and wherein $R^2$ is H or a monosubstituted or unsubstituted methyl. In still another embodiment according to the present invention, the ligand is a molecule of general Formula I as shown above or a corresponding anion, wherein $R^1$ is selected from —$CO_2H$ or —$CH(R^2)CO_2H$ and wherein $R^2$ is H or methyl.

In still another embodiment according to the present invention, the ligand is a molecule of general Formula I as shown above or a corresponding anion, wherein X is N or C—OH.

In a particularly preferred embodiment, the polydentate ligand is selected from nitrilotriacetic acid or corresponding anions and citric acid or corresponding anions, most preferably the polydentate ligand is nitrilotriacetic acid or a corresponding anion.

In a further embodiment, the solid metal complex of the inventive coating formulation is obtainable by a process comprising the following steps:
(a) providing a metal salt comprising said divalent or trivalent metal cation and a counter anion;
(b) providing said polydentate ligand;
(c) contacting the metal salt provided in step (a) and the polydentate ligand provided in step (b) to obtain a mixture;
(d) precipitating the solid metal complex from the mixture obtained in step (c);
wherein said metal salt provided in step (a) and/or said polydentate ligand provided in step (b) preferably is/are provided in the form of an aqueous preparation, more preferably in the form of an aqueous solution.

In another embodiment of the present invention, the foregoing process further comprises a step of increasing the pH value of the mixture obtained in step (c) by adding a base, preferably before and/or during precipitating step (d), most preferably before precipitating step (d).

Further details with respect to the foregoing procedure are disclosed in more detail in the section relating to the method for preparing the inventive coating formulation. It is noted that any of these details shall analogously apply with respect to the previous embodiment.

(C) The Coating Formulation

The coating formulation of the present invention is a coating formulation for digital printing media.

Digital printing refers to methods of printing from a digital-based image to a medium. Digital printing in the meaning of the present invention thus includes, for example, laser printing, inkjet printing as well as flexographic printing (flexo). In one embodiment of the present invention, the coating formulation is a coating formulation for inkjet printing media. In another embodiment, the coating formulation of the present invention is a coating formulation for flexographic printing media.

The inventive coating formulation comprises a polymeric binder and a solid metal complex as described hereinabove.

In any of the embodiments disclosed herein, the coating formulation may have a total solids content in the range of from 25 to 85 wt %, more preferably from 35 to 75 wt %, and most preferably from 50 to 72 wt %, based on the total weight of the coating formulation. In another embodiment of the present invention, the coating formulation may have a total solids content in the range of from 10 to 55 wt %, more preferably from 15 to 45 wt %, and most preferably from 20 to 40 wt %, based on the total weight of the coating formulation.

The term "total solids content" and "total dry weight" referred to herein may be used interchangeably. The total solids content or total dry weight can be determined as set out in the experimental section hereinbelow. These terms are meant to include any residual components obtained under the conditions of the corresponding measuring method, e.g. binder, metal complex, pigments, additives etc. The skilled person will recognize that the balance is a liquid medium, typically water. For example, if the total solids content is 50 wt %, the formulation contains 50 wt % of a liquid medium such as water, based on the total weight of the formulation. In a preferred embodiment, the coating formulation of the present invention is a water-based coating formulation.

In one embodiment according to the present invention, the formulation has the following composition, based on the total solids content of the formulation:
- 0.1 to 60 wt % of the solid metal complex;
- 0.1 to 60 wt % of the polymeric binder;
- optionally 0.01 to 10 wt % of one or more additives;
- wherein the solid metal complex, the polymeric binder and the additives add up to 100 wt %, based on the total solids content of the formulation.

According to another embodiment, the foregoing formulation may have a total solids content in the range of from 10 to 55 wt %, more preferably from 15 to 45 wt %, and most preferably from 20 to 40 wt %, based on the total weight of the coating formulation, with the balance being a liquid medium, preferably water.

The inventors have found that the viscosity of the inventive coating formulation is particularly useful for application on printings substrates. In one embodiment, the coating formulation has a Brookfield viscosity in the range of from 250 to 5 000 mPa·s, more preferably from 300 to 3 000 mPa·s, still more preferably from 400 to 2 500 mPa·s, and most preferably from 700 to 2 000 mPa·s.

As already set out hereinabove, the viscosity of the inventive coating formulation is low compared to the solids content. In one embodiment according to the present invention, the coating formulation has a solids content in the range of from 10 to 55 wt %, more preferably from 15 to 45 wt %, and most preferably from 20 to 40 wt %, based on the total weight of the coating formulation, wherein the Brookfield viscosity is in a range of from 250 to 5 000 mPa·s, more preferably from 300 to 3 000 mPa·s, still more preferably from 400 to 2 500 mPa·s, and most preferably from 700 to 2 000 mPa·s.

In an exemplary embodiment, the polymeric binder is polyvinyl alcohol, the metal cation is a divalent metal cation, preferably an alkaline earth metal cation or a cation selected from $Ca^{2+}$, $Mg^{2+}$ or $Zn^{2+}$, and the polydentate ligand is nitrilotriacetic acid or corresponding anions.

In another exemplary embodiment, the polymeric binder is polyvinyl alcohol, the metal cation is a divalent metal cation, preferably an alkaline earth metal cation or a cation selected from $Ca^{2+}$, $Mg^{2+}$ or $Zn^{2+}$, and the polydentate ligand is nitrilotriacetic acid or corresponding anions, wherein the coating formulation has a solids content in the range of from 10 to 55 wt %, more preferably from 15 to 45 wt %, and most preferably from 20 to 40 wt %, based on the total weight of the coating formulation, and wherein the Brookfield viscosity is in a range of from 250 to 5 000 mPa·s, more preferably from 300 to 3 000 mPa·s, still more preferably from 400 to 2 500 mPa·s, and most preferably from 700 to 2 000 mPa·s.

(D) Optional Components of the Coating Formulation

The coating formulation of the present invention may comprise further optional components or additives.

In one embodiment according to the present invention, the coating formulation further comprises an inorganic pigment. In principle, any suitable coating pigment may be added, wherein white coating pigments may be preferred. Therefore, in another embodiment, the coating formulation further comprise a white inorganic pigment, preferably selected from the group consisting of calcium carbonate, titanium dioxide, barium sulfate, zinc oxide, zinc sulfide, and mixtures thereof.

In still another embodiment, the inorganic pigment has a ISO brightness R457(%) of at least 80, preferably at least 85, more preferably at least 90, still more preferably at least 92, and most preferably at least 95.

In still another embodiment, the inorganic pigment is a calcium carbonate-containing pigment, preferably ground natural calcium carbonate (GNCC) or precipitated calcium carbonate (PCC). Calcium carbonate-containing pigments are well compatible with commonly used ink components. In the meaning of the present invention, a "ground natural calcium carbonate" (GNCC) is a calcium carbonate obtained from natural sources, such as limestone, marble, or chalk, and processed through a wet and/or dry treatment such as grinding, screening and/or fractionating, for example, by a cyclone or classifier. By contrast, a "precipitated calcium carbonate" (PCC) is a synthesised material, obtained by precipitation following reaction of carbon dioxide and lime in an aqueous, semi-dry or humid environment or by precipitation of a calcium and carbonate ion source in water. In general, the precipitated calcium carbonate may have a vateritic, calcitic or aragonitic crystal form. Suitable PCCs are described, for example, in EP 2 447 213 A1, EP 2 524 898 A1, EP 2 371 766 A1, EP 1 712 597 A1, EP 1 712 523 A1, or WO 2013/142473 A1.

The inorganic pigment, for example the calcium carbonate-containing pigment, may have a specific particle size distribution. In one embodiment, the coating formulation thus comprises an inorganic pigment having:
(i) a $d_{50}(wt)$ in the range of from 0.05 to 1.5 μm, preferably from 0.1 to 1.3 μm, more preferably from 0.2 to 1 μm, and most preferably from 0.3 to 0.9 μm; and/or
(ii) a $d_{98}(wt)$ in the range of from 0.1 to 8 μm, preferably from 0.15 to 6 μm, more preferably from 0.2 to 5.5 μm, and most preferably from 0.5 to 4.5 μm.

The coating formulation according to the present invention may contain further additives known to the skilled person. Suitable additives in the meaning of the present invention can comprise, for example, dispersants, milling aids, surfactants, rheology modifiers, lubricants, defoamers, optical brighteners, dyes, preservatives, or pH controlling agents.

Therefore, in one embodiment, the inventive coating formulation has the following relative composition:
- 100 parts by weight of inorganic pigment;
- 0.1 to 30 parts by weight, preferably 1 to 15 parts by weight of the solid metal complex;
- 0.1 to 20 parts by weight, preferably 1 to 10 parts by weight of the polymeric binder;
- optionally 0.001 to 20 parts by weight, preferably 0.01 to 8 parts by weight of one or more additives.

As indicated above, the coating formulation may have a solids content in the range of from 10 to 55 wt %, more preferably from 15 to 45 wt %, and most preferably from 20 to 40 wt %, based on the total weight of the coating formulation. In cases where the inventive coating formulation further comprises an inorganic pigment, for example a calcium carbonate-containing pigment, the solids content may preferably be in a range of from 25 to 85 wt %, more preferably from 35 to 75 wt %, and most preferably from 50 to 72 wt %, based on the total weight of the coating formulation.

As described herein above, the coating formulation may be a water-based coating formulation, meaning that the balance is water.

Therefore, in one embodiment according to the present invention, the coating formulation has the following composition, based on the total weight of the coating formulation:

0.1 to 20 wt %, preferably 1 to 15 wt % solid metal complex;
0.5 to 15 wt %, preferably 1 to 10 wt % polymeric binder;
1.0 to 75 wt %, preferably 5 to 65 wt % inorganic pigment;
optionally 0.01 to 15 wt %, preferably 0.05 to 10 wt % additives;
with the balance being a liquid medium, preferably water. According to another embodiment, the foregoing formulation may have a total solids content in the range of from 25 to 85 wt %, more preferably from 35 to 75 wt %, and most preferably from 50 to 72 wt %, based on the total weight of the coating formulation.

The viscosity of the inventive coating formulation is low compared to the solids content also in cases where the formulation comprises an inorganic pigment. Thus, in one embodiment of the present invention, the coating formulation further comprises an inorganic pigment, wherein the solids content is in the range of from 25 to 85 wt %, more preferably from 35 to 75 wt %, and most preferably from 50 to 72 wt %, based on the total weight of the coating formulation, and wherein the Brookfield viscosity is in a range of from 250 to 5 000 mPa·s, more preferably from 300 to 3 000 mPa·s, still more preferably from 400 to 2 500 mPa·s, and most preferably from 700 to 2 000 mPa·s.

In an exemplary embodiment, the polymeric binder is polyvinyl alcohol, the metal cation is a divalent metal cation, preferably an alkaline earth metal cation or a cation selected from $Ca^{2+}$, $Mg^{2+}$ or $Zn^{2+}$, the polydentate ligand is nitrilotriacetic acid or corresponding anions and the formulation further comprises an inorganic pigment, preferably a calcium carbonate-containing pigment as disclosed hereinabove.

In another exemplary embodiment, the polymeric binder is polyvinyl alcohol, the metal cation is a divalent metal cation, preferably an alkaline earth metal cation or a cation selected from $Ca^{2+}$, $Mg^{2+}$ or $Zn^{2+}$, the polydentate ligand is nitrilotriacetic acid or corresponding anions and the formulation further comprises an inorganic pigment, preferably a calcium carbonate-containing pigment as disclosed hereinabove, wherein the coating formulation has a solids content in the range of from 25 to 85 wt %, more preferably from 35 to 75 wt %, and most preferably from 50 to 72 wt %, based on the total weight of the coating formulation, and wherein the Brookfield viscosity is in a range of from 250 to 5 000 mPa·s, more preferably from 300 to 3 000 mPa·s, still more preferably from 400 to 2 500 mPa·s, and most preferably from 700 to 2 000 mPa·s.

(E) Method for Preparing the Coating Formulation

The present invention further relates to a method for preparing the inventive coating formulation, the method comprising the following steps:
(a) providing a polymeric binder;
(b) providing a solid metal complex having a solubility in water of less than 25 g/l at 23° C. determined according to ISO 787-3:2000, said solid metal complex comprising:
(i) a divalent or trivalent metal cation; and
(ii) a polydentate ligand;
(c) mixing the polymeric binder provided in step (a) with the solid metal complex provided in step (b) and, optionally, with an inorganic pigment;
characterized in that the polydentate ligand is a molecule of general Formula I or a corresponding anion:

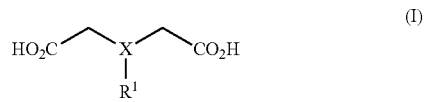

wherein
X is N, C—H or C—OH; and
$R^1$ is selected from —$CO_2H$ or —$CH(R^2)CO_2H$, wherein $R^2$ is H or a substituted or unsubstituted alkyl, preferably H or a substituted or unsubstituted $C_1$ to $C_5$ alkyl, and most preferably H or a substituted or unsubstituted $C_1$ alkyl, wherein the polydentate ligand is nitrilotriacetic acid or a corresponding anion.

The embodiments and details disclosed above with respect to the inventive coating formulation (binders, metal cations, ligands etc.) accordingly apply to the corresponding preparation method disclosed in the following. Vice versa, the embodiments and details disclosed hereinafter also apply to the inventive coating formulation.

For example, the coating formulation may further comprises an inorganic pigment or one or more optional additives. In one embodiment, the method thus comprises the following steps:
(a) providing a polymeric binder;
(b) providing a solid metal complex having a solubility in water of less than 25 g/l at 23° C. determined according to ISO 787-3:2000, said solid metal complex comprising:
(i) a divalent or trivalent metal cation; and
(ii) a polydentate ligand;
(c) providing an inorganic pigment;
(d) mixing, in any order, the polymeric binder provided in step (a), the solid metal complex provided in step (b), the inorganic pigment provided in step (c) and, optionally, one or more additives;
characterized in that the polydentate ligand is nitrilotriacetic acid or a corresponding anion.

The metal complex of the inventive coating composition may used as received from commercial suppliers or the complex may be prepared in a separate process.

Therefore, in one embodiment, the method for preparing the coating formulation of the present invention further comprises the following process for preparing the solid metal complex:
(a) providing a metal salt comprising said divalent or trivalent metal cation and a counter anion;
(b) providing said polydentate ligand;

(c) contacting the metal salt provided in step (a) and the polydentate ligand provided in step (b) to obtain a mixture;
(d) precipitating the solid metal complex from the mixture obtained in step (c).

Another aspect of the present invention thus relates to a method for preparing the inventive coating formulation, the method comprising the following steps:
(a) providing a polymeric binder;
(b) providing a solid metal complex having a solubility in water of less than 25 g/l at 23° C. determined according to ISO 787-3:2000, said solid metal complex comprising:
  (i) a divalent or trivalent metal cation; and
  (ii) a polydentate ligand;
  wherein the step of providing the solid metal complex comprises the following partial steps:
  (i) providing a metal salt comprising said divalent or trivalent metal cation and a counter anion;
  (ii) providing said polydentate ligand;
  (iii) contacting the metal salt provided in partial step (i) and the polydentate ligand provided in partial step (ii) to obtain a mixture;
  (iv) precipitating the solid metal complex from the mixture obtained in partial step (iii);
(c) mixing the polymeric binder provided in step (a) with the solid metal complex provided in step (b) and, optionally, with an inorganic pigment;
characterized in that the polydentate ligand is nitrilotriacetic acid or a corresponding anion.

Accordingly, still another aspect of the present invention relates to a method for preparing the inventive coating formulation, the method comprising the following steps:
(a) providing a polymeric binder;
(b) providing a solid metal complex having a solubility in water of less than 25 g/l at 23° C. determined according to ISO 787-3:2000, said solid metal complex comprising:
  (i) a divalent or trivalent metal cation; and
  (ii) a polydentate ligand;
  wherein the step of providing the solid metal complex comprises the following partial steps:
  (i) providing a metal salt comprising said divalent or trivalent metal cation and a counter anion;
  (ii) providing said polydentate ligand;
  (iii) contacting the metal salt provided in partial step (i) and the polydentate ligand provided in partial step (ii) to obtain a mixture;
  (iv) precipitating the solid metal complex from the mixture obtained in partial step (iii);
(c) providing an inorganic pigment;
(d) mixing, in any order, the polymeric binder provided in step (a), the solid metal complex provided in step (b), the inorganic pigment provided in step (c) and, optionally, one or more additives;
characterized in that the polydentate ligand is nitrilotriacetic acid or a corresponding anion.

In cases where the formulation further comprises an inorganic pigment, the mixing step may, in general, be carried out in any order. In a preferred embodiment, the polymeric binder and the inorganic pigment are mixed in a first partial step before adding the solid metal complex in a second partial step.

In any of the foregoing embodiments, the metal salt and/or said polydentate ligand may be provided in the form of an aqueous preparation, preferably in the form of an aqueous solution.

In order to facilitate or improve precipitation of the solid metal complex, the use of highly concentrated aqueous preparations, preferably solutions, of the metal salt and/or the polydentate ligand may be advantageous. Therefore, in one embodiment of the invention, the metal salt and/or the polydentate ligand is/are be provided as aqueous preparation(s), preferably aqueous solution(s), having a concentration of from 5 to 65 wt %, preferably 10 to 55 wt %, and most preferably 20 to 45 wt %, based on the total weight of the aqueous preparation.

In order to provide the metal salt in the form of an aqueous solution, it may be advantageous if the metal salt is a water-soluble metal salt, wherein "water-soluble" means that the metal salt has a solubility in water of 25 g/l or higher at 23° C. determined according to ISO 787-3:2000. In one embodiment, the metal salt has a solubility in water of at least 50 g/l at 23° C., preferably at least 100 g/l at 23° C., more preferably at least 250 g/l at 23° C., and most preferably at least 500 g/l at 23° C., each determined according to ISO 787-3:2000.

The metal salt comprises the divalent or trivalent metal cation of the metal complex (e.g. $Ca^{2+}$, $Mg^{2+}$ or $Zn^{2+}$) and a counter anion. The counter anion used in the preparation of the metal complex may, for example, influence the water solubility of the metal salt or the properties of the metal complex. In one embodiment, the counter anion of the metal salt is a monovalent or divalent anion, preferably a monovalent anion, more preferably an anion selected from the group consisting of $Br^-$, $Cl^-$, $I^-$ and $NO_3^-$, even more preferably an anion selected from $Cl^-$ and $NO_3^-$, and most preferably the counter anion is $Cl^-$.

The metal complex used in the inventive coating formulation may be prepared or is obtainable by a process comprising a step of contacting a metal salt as disclosed hereinabove and a polydentate ligand as disclosed hereinabove. Increasing the pH may facilitate the formation of corresponding anions and complex formation depending on the used form of the ligand (e.g. free acid or salt) or the acidity of the ligand protons at the donor sites. Therefore, in one embodiment, the process for preparing the solid metal complex further comprises a partial step of adjusting the pH value of the mixture obtained by contacting the metal salt and the polydentate ligand by adding a base, preferably before and/or during the precipitating step. Preferably, the base is added before the precipitating step. In another preferred embodiment, the pH value of the mixture is adjusted to at least 9, preferably at least 10, and most preferably at least 11.

Thus, in another embodiment, the method for preparing the coating formulation of the present invention further comprises the following process for preparing the solid metal complex:
(a) providing a metal salt comprising said divalent or trivalent metal cation and a counter anion;
(b) providing said polydentate ligand;
(c) contacting the metal salt provided in step (a) and the polydentate ligand provided in step (b) to obtain a mixture;
(d) precipitating the solid metal complex from the mixture obtained in step (c);
(e) increasing the pH value of the mixture obtained in step (c), preferably before and/or during precipitating step (d), more preferably before precipitating step (d).

The step of adjusting the pH may be carried out by adding, for example, a solid hydroxide or carbonate base or a corresponding (aqueous) solution, for example solid sodium hydroxide, solid sodium carbonate or a corresponding aqueous solution.

The solid metal complex obtained in the precipitating step referred to hereinabove may either be used directly, e.g. in the form of a suspension, or it may be isolated by any method known to the skilled person.

In another embodiment, the process for preparing the solid metal complex further comprises a step of drying the solid metal complex obtained in the precipitating step. In still another embodiment, the solid metal complex has a total moisture content of less than or equal to 15 wt %, preferably less than or equal to 10 wt %, more preferably less than or equal to 5 wt %, even more preferably less than or equal to 1 wt %, and most preferably between 0.05 and 0.5 wt %, based on the total weight of the solid metal complex.

In still another embodiment, the process for preparing the solid metal complex further comprises a step of grinding the solid metal complex obtained in the precipitating step referred to hereinabove. Said grinding step may be carried out as a wet grinding step or, if the process includes a drying step as described above, as a dry grinding process. The grinding process may be carried out with any conventional grinding device, for example, under conditions such that comminution predominantly results from impacts with a secondary body, i.e. in one or more of a ball mill, a rod mill, a vibrating mill, a roll crusher, a centrifugal impact mill, a vertical bead mill, an attrition mill, a pin mill, a hammer mill, a pulverizer, a shredder, a de-clumper, a knife cutter, or other such equipment known to the skilled person. In case of wet grinding, the grinding step may be performed under conditions such that autogenous grinding takes place and/or by horizontal ball milling, and/or other such processes known to the skilled person.

The solid metal complex used in the coating formulation of the present invention may be characterized by a specific particle size distribution. In one embodiment, the solid metal complex has:
 (i) a $d_{50}(vol)$ in the range of from 0.1 to 100 µm, preferably from 0.2 to 75 µm, and most preferably from 0.5 to 50 µm; and/or
 (ii) a $d_{98}(vol)$ in the range of from 0.5 to 360 µm, preferably from 1 to 100 µm, and most preferably from 2 to 80 µm.

As already disclosed herein above, the solid metal complex is obtainable by a process comprising the steps of contacting the metal salt and the polydentate ligand to obtain a mixture and precipitating the metal complex from said mixture. In such a process, the metal salt (i.e. the divalent or trivalent metal cation) and the polydentate ligand may be used in a specific molar ratio. In one embodiment of the present invention, the metal cation and the polydentate ligand are used in a molar ratio of from 10:1 to 1:10, preferably 5:1 to 1:5, more preferably 2:1 to 1:2, still more preferably about 1.5:1 to about 1:1.5, and most preferably about 1:1 (i.e. equimolar ratio).

(F) Further Aspects of the Invention

The present invention further relates to a digital printing medium and a method for preparing same by using the inventive coating formulation.

The method for preparing the digital printing medium of the present invention comprises the following steps:
 (a) providing a printable substrate having at least one printable surface;
 (b) providing the coating formulation disclosed hereinabove;
 (c) applying the coating formulation provided in step (b) onto said at least one printable surface of the printable substrate provided in step (a).

The inventors have found, surprisingly, that the digital printing medium obtainable by the foregoing method provides improved printing properties, such as ink fixation capacity and ink density.

The coating formulation may be applied by any coating method known to the skilled person. In one embodiment, the coating formulation is applied by using a blade coater, a curtain coater, a rod coater or a size press. In a preferred embodiment of the invention, coating step (b) is carried out by means of a blade coater.

In general, the invention is not limited to a specific type of digital printing medium and the coating may be applied to many different printable substrates. In one embodiment, the printable substrate is a precoated or uncoated cardboard substrate, a precoated or uncoated paper substrate, a polymer substrate, a textile-based substrate or a wooden substrate, preferably a precoated or uncoated cardboard or paper substrate, and most preferably a precoated or uncoated paper substrate. In the meaning of the present invention, the term "precoated" refers to substrates that have a pigment-containing coating while the term "uncoated" refers to substrates that do not have a pigment-containing coating.

As described earlier, the inventive coating formulation optionally comprises a pigment, such as a calcium carbonate-containing pigment. The pigment-containing coating formulation according to the present invention is particularly suitable for application on uncoated substrates, such as uncoated cardboard or paper substrates.

In case the pigment is not defined as a mandatory component, the inventive coating formulation is particularly suitable for application on precoated substrates, such as precoated cardboard or paper substrates.

The coating weight applied to the printable substrate may be varied depending on the specific needs of the digital printing medium and may be comparably high while, at the same time, the application to the substrate is improved due an optimal viscosity of the formulation.

In one embodiment according to the present invention, the coating weight of the inventive coating formulation is in a range of from 0.5 to 50 $g/m^2$, preferably 1 to 30 $g/m^2$, and most preferably 2 to 5 $g/m^2$ or 5 to 15 $g/m^2$. In general, the coating weight is higher if the inventive coating formulation further comprises an inorganic pigment. The coating weight can be determined as described hereinafter in the experimental section.

The inventive coating formulation and the corresponding digital printing media may be used for the manufacture of a large number of different digitally printed products, such as stickers, labels, tags, tickets, posters, wallpapers, documents, passports, identification cards, banknotes or postage stamps, and digitally printed textile products such as garments or curtains.

EXAMPLES

Figure 1:
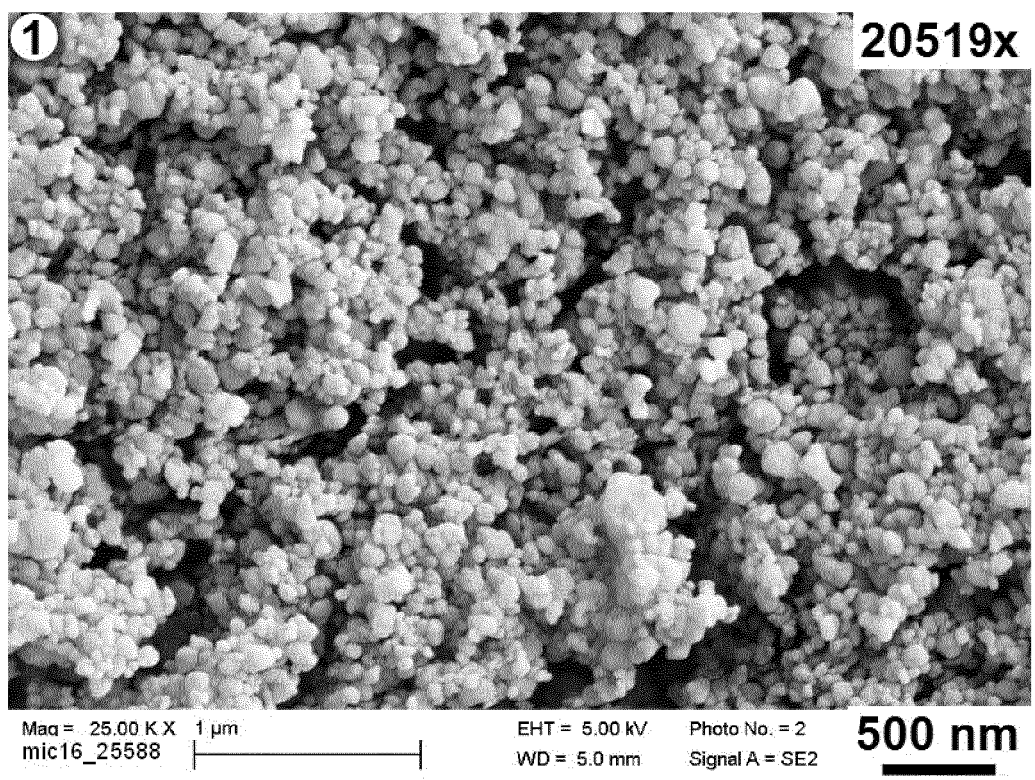
FIG. 1: SEM picture of calcium-NTA complex obtained from calcium chloride as calcium source.

The scope and interest of the invention may be better understood on basis of the following examples which are intended to illustrate embodiments of the present invention.

(A) ANALYTICAL METHODS

All parameters defined throughout the present application and mentioned in the following examples are based on the following measuring methods:

Brightness (Powders)

Brightness of solids is measured using an ELREPHO 450X from the company Datacolor according to ISO 2469: 2014. The brightness measurement was performed immediately after preparing the tablet. The obtained values are reported as ISO brightness R457 in %.

Water Solubility

Solubility measurements are performed according ISO 787-3:2000. The solution was allowed for decantation for 24 h and the filtration was performed at 23° C. by using filters with 0.2 µm pores to ensure total filtration of small particles.

Brookfield Viscosity

The Brookfield viscosity is measured by a Brookfield DV III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 seconds after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

Total Solids Content

The total solids content was measured with Smart System 5 from CEM Corporation (USA) with the following settings: temperature of 120° C., automatic switch off 3, standard drying, sample size 2 to 4 g.

Particle Size Distribution

The weight-based median particle size $d_{50}(wt)$ and top cut $d_{98}(wt)$ are measured by the sedimentation method, which is an analysis of sedimentation behaviour in a gravimetric field. The measurement is made with a Sedigraph™ 5120 of Micromeritics Instrument Corporation, USA. The method and the instrument are known to the skilled person and are commonly used to determine particle size distributions of fillers and pigments. The measurement is carried out in an aqueous solution of 0.1 wt % $Na_4P_2O_7$. The samples are dispersed using a high speed stirrer and sonication.

The volume-based median particle size $d_{50}(vol)$ and the volume-based top cut particle size $d_{98}(vol)$ are evaluated using a Malvern Mastersizer 2000 Laser Diffraction System (Malvern Instruments Plc., Great Britain). The raw data obtained by the measurement is analyzed using the Mie theory, with a particle refractive index of 1.57 and an absorption index of 0.005. The methods and instruments are known to the skilled person and are commonly used to determine particle size distributions of fillers and pigments.

To determine the volume-based particle size distribution of the solid metal complex, the measurement is carried out in water as solvent, and the water is saturated with the complex to be measured. Then the measurement is started.

Elemental Analysis

Elemental analysis (CHN analysis) is performed on a Vario EL III from Elementar Analysensysteme GmbH. The method and the instruments are known to the skilled person and are commonly used to determine CHN percentages.

Total Moisture Content (Karl Fischer Titration)

The total moisture contents as defined herein are measured according to the Karl Fischer coulometric titration method, desorbing the moisture in an oven at 220° C. for 10 min and passing it continuously into a Karl Fischer coulometer (Mettler Toledo coulometric KF Titrator C30, combined with Mettler Toledo oven DO 0337) using dry nitrogen at 100 ml/min for 10 min. A calibration curve using water is recorded and a blank of 10 min nitrogen flow without a sample is taken into account.

Coating Weight

Coating weights of coated papers are analyzed according the normed method EN ISO 536:2012.

Paper Humidity

Paper humidity of manufactured papers is measured according the normed method EN ISO 287:2009.

pH Measurement pH is measured at 25° C. using a Mettler-Toledo Seven Easy pH meter and a Mettler-Toledo InLab Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (signal differs by less than 0.1 mV from the average over the last 6 seconds).

Ink Density

Ink density is analyzed with a SpectroDens from the company Techkon GmbH according to DIN 16527-3:1993-11. The density is calculated from the average of 10 measurements after calibration on a white part of the sample paper. Used parameters: D50 light, angle 2°, ISO E.

Microscopic Pictures of Metal Complexes

Pictures are taken under the field emission scanning electron microscope (FESEM, Zeiss Sigma VP) using the secondary electron detector (SE2) to show the particle structure of the samples. The methods and the instruments are known to the skilled person.

Microscopic Pictures of Printed Papers

Pictures are taken with a PCE-MM200 digital microscope from PCE Instruments (UK Limited).

(B) MATERIALS

All commercially available materials and reagents were purchased and used without further purification.

Chemicals

Nitrilotriacetic acid trisodium salt monohydrate (#72565) was obtained from Sigma-Aldrich. Anhydrous calcium chloride was obtained from IMPAG AG (#17033) and Sigma-Aldrich (#C1016) as granules. Sodium carbonate (#S6014) was obtained from Sigma-Aldrich. Citric acid (#C0759) was obtained from Sigma-Aldrich. Nitrilotriacetic acid (NTA) was obtained from Sigma-Aldrich (#N9877). Tricalcium citrate tetrahydrate (Powder N, #M7090) was purchased from Jungbunzlauer (Univar AG) and Sigma-Aldrich (#359734). Starch (C*Film™ 07311) was obtained from Cargill. The polyvinyl alcohol (PVA) used herein was a commercially available fully hydrolyzed BF-04 grade PVA. Rheocarb™ 121 was obtained from Coatex Arkema Group. Litex PX 9460 was purchased from Synthomer Deutschland GmbH. Catiofast BP was obtained from BASF.

The following calcium carbonates were used as inorganic pigments:
  Calcium carbonate 1: Ground natural calcium carbonate, suspension, 72% solids content, $d_{98}(wt)=4$ µm, $d_{50}(wt)=0.6$ µm
  Calcium carbonate 2: Ground natural calcium carbonate, suspension, 60% solids content, $d_{98}(wt)=1.0$ µm, $d_{50}(wt)=0.37$ µm
  Calcium carbonate 3: Ground natural calcium carbonate, suspension, 60% solids content, $d_{98}(wt)=0.8$ µm, $d_{50}(wt)=0.3$ µm
  Paper Substrates
  Paper 1: Uncoated, Metsä Board Kemi Liner, 135 g/m²
  Paper 2: Uncoated, Rieger SpreeWhite C, 125 g/m²
  Paper 3: Pre-coated, Metsä Board Kemiart Brite 135 g/m²

(C) EXAMPLES

The following examples are not to be construed to limit the scope of the claims in any manner whatsoever.

Example 1—General Procedures for Preparing Metal Complexes

Different possibilities were tested to synthesize solid metal complexes used in the present invention.

Example 1A (Calcium-NTA Complex)

Modified procedure of E. R. Souaya et al., *Molecules* 2000, 5, 1121-1129: Nitrilotriacetic acid (0.38 mol), ground natural calcium carbonate (0.38 mol, $d_{50}(wt)=1.7$ µm, $d_{98}(wt)=5$ µm) and sodium carbonate (0.19 mol, Sigma Aldrich #S6014) were added in this order to 3.8 litres of $H_2O$. The suspension was heated to 90° C. for 3 h. The volume was concentrated by heating and the reaction mixture was then allowed to cool down to 53° C. Subsequently, 0.5 litres ethanol (96 vol %) were added. The mixture was cooled down to room temperature and the suspension was filtrated (Whatman, grade 5, pore size 2.5 µm, d=185 mm, #1005-185). The filter cake was washed twice with 400 mL ethanol (96 vol %) and dried at 105° C. over night to obtain the calcium complex as a white powder.

Example 1B (Calcium-NTA Complex)

Nitrilotriacetic acid trisodium salt monohydrate (1 mole equivalent) was dissolved in water with at a solids content of 40 wt %. To this solution was added calcium chloride or calcium nitrate as a solution (1 to 3 mole equivalent, 35 wt % in $H_2O$) under stirring and a white solid was formed. The obtained homogenous suspension was then used directly for preparing the coating formulations of the present invention, or the solid was filtered and dried in an oven at 110° C. for 24 h to obtain the calcium complex as a white powder.

The solid may be ground with a ZM 200 machine from the company Retsch GmbH (Germany).

A SEM picture of a calcium-NTA complex obtainable according to Example 1B (calcium chloride was used as calcium source) is shown in FIG. 1.

Parameters of Different Metal Complexes

The following metal complexes were analyzed exemplarily to confirm the chemical composition:

|  | Calcium-NTA | | Tricalcium citrate | |
|---|---|---|---|---|
| Origin | Example 1A | | Commercial (#M7090) | |
| ISO brightness R457 (%) | 95.4 | | 97.0 | |
| Solubility (g/100 mL) | 2.38 | | 1.7 | |
| Particle size | $d_{98}(vol) < 6$ µm | | $d_{90}(vol) < 70$ µm | |
| Moisture (Karl Fischer) | 2.11% | | 13.03% | |
| Elemental analysis | Calcd. | Found | Calcd. | Found |
| C (%) | 28.08 | 27.71 | 25.15 | 25.96 |
| N (%) | 5.46 | 5.33 | — | <0.2 |
| H (%) | 2.58 | 2.57 | 3.20 | 3.07 |

Example 2—Preparation of Coating Formulations

Example 2A

Polyvinyl alcohol (BF-04; 465.0 g, 25%, 36.8 wt % based on total amount of dry material) was in a first phase dissolved in water at 90° C. for 30 min using a HB4 basic heating bath and Eurostar laboratory stirrer (1 000 rpm) from IKA Labortechnik. At the same time calcium-NTA complex was prepared by adding a $CaCl_2$ solution (166.0 g, 35%, 18.1 wt % based on total amount of dry material) to a NTA trisodium solution (363.0 g, 40%, 45.1 wt % based on total amount of dry material). After formation of the white precipitate, the suspension was added to the polyvinyl alcohol and the solution was stirred at room temperature for 15 min before using it in the coating machine.

Example 2B

Polyvinyl alcohol (BF-04; 115.0 g, 25%, 5.4 wt % based on total amount of dry material) was in a first phase dissolved in water at 90° C. for 30 min using a HB4 basic and Eurostar (1 000 rpm) from IKA Labortechnik. The solubilized polyvinyl alcohol was added subsequently to calcium carbonate 2 (803.0 g, 60%, 88.5 wt % based on total amount of dry material). At the same time, calcium-NTA complex was prepared by adding a $Ca(NO_3)_2$ solution (44.0 g, 35%, 2.8 wt % based on total amount of dry material) to a NTA trisodium solution (45.0 g, 40%, 3.3 wt % based on total amount of dry material). After formation of the white precipitate, the suspension was added to the polyvinyl alcohol/calcium carbonate and the mixture was stirred at room temperature for 15 min before using it in the coating machine.

Example 2C

Polyvinyl alcohol (BF-04; 116.0 g, 25%, 5.5 wt % based on total amount of dry material) was in a first phase dissolved in water at 90° C. for 30 min using a HB4 basic and Eurostar (1 000 rpm) from IKA Labortechnik. The solubilized polyvinyl alcohol was added subsequently to calcium carbonate 2 (808.0 g, 60%, 89.8 wt % based on total amount of dry material). At the same time, calcium-NTA complex was prepared by adding a $CaCl_2$ solution (21.1 g, 35%, 1.4 wt % based on total amount of dry material) to a NTA trisodium solution (45.0 g, 40%, 3.3 wt % based on total amount of dry material). After formation of the white precipitate, the suspension was added to the polyvinyl alcohol/calcium carbonate and the mixture was stirred at room temperature for 15 min before using it in the coating machine.

Example 2D (Comparative)

Polyvinyl alcohol (BF-04; 114.0 g, 25%, 5.3 wt % based on total amount of dry material) was in a first phase dissolved in water at 90° C. for 30 min using a HB4 basic and Eurostar (1 000 rpm) from IKA Labortechnik. The solubilized polyvinyl alcohol was added subsequently to calcium carbonate 3 (793.7 g, 60%, 86.1 wt % based on total amount of dry material). Commercial tricalcium citrate (12.4 g, 100%, 2.2 wt % based on total amount of dry material) was added under stirring. Finally, Catiofast (81.0 g, 44%, 6.4 wt % based on total amount of dry material) was added and the solution was stirred at room temperature for 15 min before using it in the coating machine.

Example 2E (Comparative)

Polyvinyl alcohol (BF-04; 119.0 g, 25%, 5.3 wt % based on total amount of dry material) was in a first phase dissolved in water at 90° C. for 30 min using a HB4 basic and Eurostar (1 000 rpm) from IKA Labortechnik. The solubilized polyvinyl alcohol was added subsequently to calcium carbonate 3 (832.0 g, 60%, 86.1 wt % based on total amount of dry material). Commercial tricalcium citrate (50.0 g, 100%, 8.6 wt % based on total amount of dry material) was added under stirring. The solution was stirred at room temperature for 15 min before using it in the coating machine.

Precoating Formulation Used for Coatings of Examples 2F/2G

To calcium carbonate 1 (626 kg, 72%, 90.5 wt % based on total amount of dry material) was added Litex PX 9460 (90 kg, 45%, 9.0 wt % based on total amount of dry material). The solution was stirred at room temperature and Rheocarb™ 121 (9 kg, 25%, 0.5 wt % based on total amount of dry material) was added. The mixture was stirred for 15 min at room temperature before using it on the coating machine.

Example 2F (Comparative)

Polyvinyl alcohol (BF-04; 181 kg, 25.5%, 54.6 wt % based on total amount of dry material) was in a first phase dissolved in water at 90° C. for 30 min. An aqueous suspension of tricalcium citrate (96 kg, 40%, 45.4 wt % based on total amount of dry material) was added to the polyvinyl alcohol under stirring condition. The solution was stirred at room temperature for 15 min before using it in the coating machine.

Example 2G (Comparative)

Polyvinyl alcohol (BF-04; 42 kg, 25%, 5.7 wt % based on total amount of dry material) was in a first phase dissolved in water at 90° C. for 30 min. A tricalcium citrate suspension (11 kg, 40%, 2.3 wt % based on total amount of dry material) was added to calcium carbonate 1 (243 kg, 71.8%, 92.0 wt % based on total amount of dry material) previously added to polyvinyl alcohol. The resulting pH was 8.7 and therefore no adjustment was needed and the solution was stirred for 30 min at room temperature.

Example 2H (Comparative)

Polyvinyl alcohol (BF-04; 110.0 g, 25%, 5.1 wt % based on total amount of dry material) was in a first phase dissolved in water at 90° C. for 30 min using a HB4 basic and Eurostar (1 000 rpm) from IKA Labortechnik. The solubilized polyvinyl alcohol was added subsequently to calcium carbonate 2 (808.0 g, 60%, 88.5 wt % based on total amount of dry material). At the same time, calcium EDTA complex was prepared by adding a $CaCl_2$ solution (21.0 g, 35%, 1.3 wt.-% based on total amount of dry material) to an EDTA trisodium solution (69 g, 40%, 5.1 wt % based on total amount of dry material). The resulting mixture was added to the polyvinyl alcohol/calcium carbonate and the solution was stirred at room temperature for 15 min before using it in the coating machine.

Example 2I (Comparative)

The composition of this coating formulation corresponds to a commercial coating formulation containing 2.5 parts by weight of calcium chloride per 100 parts calcium carbonate pigment as ink fixation agent.

Polyvinyl alcohol (BF-04; 49.1 g, 25%, 5.3 wt % based on total amount of dry material) was in a first phase dissolved in water at 90° C. for 30 min using a HB4 basic and Eurostar (1 000 rpm) from IKA Labortechnik. The solubilized polyvinyl alcohol was added subsequently to calcium carbonate 3 (341.3 g, 60%, 86.1 wt % based on total amount of dry material). Catiofast BP (34.9 g, 44%, 6.4 wt.-% based on total amount of dry material) and $CaCl_2$ solution (14.6 g, 35%, 2.2 wt.-% based on total amount of dry material) were added subsequently in this order. The resulting mixture was stirred at room temperature for 15 min before using it in the coating machine.

The chemical composition of the coating formulations prepared in Examples 2A-2I is summarized in Tables 1 and 2 hereinbelow.

TABLE 1

| Coating formulations (pigment-based coatings only) | | | | | | | |
|---|---|---|---|---|---|---|---|
| | Parts by weight | | | | | | |
| | Ex. 2B | Ex. 2C | Ex. 2D (comp) | Ex. 2E (comp) | Ex. 2G (comp) | Ex. 2H (comp.) | Ex. 2I (comp.) |
| Calcium carbonate 1 | | | | | 100 | | |
| Calcium carbonate 2 | 100 | 100 | | | | 100 | |
| Calcium carbonate 3 | | | 100 | 100 | | | 100 |
| Tricalcium citrate | | | | | 2.6 | | |
| Tricalcium citrate | | | 2.6 | 10 | | | |
| NTA | 3.75 | 3.75 | | | | | |
| EDTA | | | | | | 5.75 | |
| $CaCl_2$ | | 1.5 | | | | 1.5 | 2.5 |

TABLE 1-continued

Coating formulations (pigment-based coatings only)

Parts by weight

| | Ex. 2B | Ex. 2C | Ex. 2D (comp) | Ex. 2E (comp) | Ex. 2G (comp) | Ex. 2H (comp.) | Ex. 2I (comp.) |
|---|---|---|---|---|---|---|---|
| $Ca(NO_3)_2$ | 2.2 | | | | | | |
| PVA (BF-04) | 6.0 | 6.0 | 6.0 | 6.0 | 6.0 | 5.75 | 6 |
| Catiofast BP | | | 7.5 | | | | 7.5 |

TABLE 2

Coating formulations (all coatings)

wt % based on total solids content

| | Ex. 2A | Ex. 2B | Ex. 2C | Ex. 2D (comp) | Ex. 2E (comp) | Ex. 2F (comp) | Ex. 2G (comp) | Ex. 2H (comp.) | Ex. 2I (comp.) |
|---|---|---|---|---|---|---|---|---|---|
| Calcium carbonate 1 | | | | | | | 92.0 | | |
| Calcium carbonate 2 | | 88.5 | 89.8 | | | | | 88.5 | |
| Calcium carbonate 3 | | | | 86.1 | 86.1 | | | | 86.1 |
| Tricalcium citrate | | | | | | 45.4 | 2.3 | | |
| Tricalcium citrate | | | | 2.2 | 8.6 | | | | |
| Nitrilotriacetic acid trisodium salt monohydrate (NTA salt) | 45.1 | 3.3 | 3.3 | | | | | | |
| EDTA | | | | | | | | 5.1 | |
| $CaCl_2$ | 18.1 | | 1.4 | | | | | 1.3 | 2.2 |
| $Ca(NO_3)_2$ | | 2.8 | | | | | | | |
| PVA (BF-04) | 36.8 | 5.4 | 5.5 | 5.3 | 5.3 | 54.6 | 5.7 | 5.1 | 5.3 |
| Catiofast BP | | | | 6.4 | | | | | 6.4 |

Example 3—Coating Properties and Trials

Examples 3A-3E, Example 3H (Comparative)

The coating formulations prepared in Examples 2A-2E and 2H were first characterized and then applied to different paper substrates. Coating experiments where performed on a Webcoater from Durrer (Switzerland) equipped with a blade coat head. Blades were obtained from Durrer (Switzerland) and were characterized by a thickness of 0.3 mm with a pre-grinding angle of 20°. The machine is known to the skilled person and is commonly used to coat paper.

Examples 3F and 3G (Comparative)

The coating formulations prepared in Examples 2F and 2G where first characterized and then applied to different paper substrates after applying the corresponding precoating formulation (see Example 2). Coating experiments where performed on a Valmet coating pilot machine at Keskuslaboratorio-Centrallaboratorium Ab (KCL), Espoo, Finland, equipped with a blade coat head. Blades used on the KCL machine were provided by Uddeholm and were characterized by a thickness of 0.381 mm with a pre-grinding angle of 40°. The machine is known to the skilled person and is commonly used to coat paper.

Example 3I (Comparative)

The physical properties of the coating prepared in Example 2I were characterized as for the coatings of Examples 2A-2H.

The coating properties and results of the coating trials of Examples 3A-3I are summarized in Table 3 hereinbelow.

TABLE 3

Coating properties and results

| | Ex. 3A | Ex. 3B | Ex. 3C | Ex. 3D (comp) | Ex. 3E (comp) | Ex. 3F (comp) | Ex. 3G (comp) | Ex. 3H (comp.) | Ex. 3I (comp.) |
|---|---|---|---|---|---|---|---|---|---|
| Paper substrate | 2 | 2 | 2 | 3 | 3 | 1 | 1 | 1 | — |
| Pre-coating | — | — | — | — | — | (2F) | (2G) | — | — |
| Coating | 2A | 2B | 2C | 2D | 2E | 2F | 2G | 2H (comp.) | 2I (comp.) |
| Solids Content (%) | 30.9 | 54.4 | 53.0 | 55.0 | 57.7 | 64.2 | 27.5 | 64.2 | 63.9 | 54.4 | 47.35 |
| Viscosity (mPa · s) | 1950 | 900 | 1300 | 880 | 340 | 735 | 300 | 735 | 280 | 166 | 2500 |
| pH | 9.2 | 9.7 | 9.6 | 8.1 | 8.4 | 8.4 | 7.5 | 8.4 | 8.7 | 9.0 | 6.47 |
| Temperature (° C.) | 42 | 27 | 30 | 27 | 27 | 23 | 23 | 23 | 23 | 33 | — |
| Coater speed (m/min) | 20 | 20 | 20 | 20 | 20 | 700 | 700 | 700 | 700 | 20 | — |
| Blade thickness (mm) | 0.3 | 0.3 | 0.3 | 0.3 | 0.3 | 0.381 | 0.381 | 0.381 | 0.381 | 0.3 | — |
| Blade load (bar) | 0.6 | 0.6 | 0.6 | 0.6 | 0.6 | 0.53 | 0.3 | 0.53 | 1.65 | 0.6 | — |
| Beam angle (°) | 20 | 20 | 20 | 20 | 20 | 50 | 50 | 50 | 50 | 20 | — |

TABLE 3-continued

Coating properties and results

|  | Ex. 3A | Ex. 3B | Ex. 3C | Ex. 3D (comp) | Ex. 3E (comp) | Ex. 3F (comp) | Ex. 3G (comp) | Ex. 3H (comp.) | Ex. 3I (comp.) |
|---|---|---|---|---|---|---|---|---|---|
| Coating weight (g/m²) | 3.4 | 10.5 | 9.5 | 7.7 | 6.7 | 10 | 3.0 | 10 | 6.0 | 6.5 | — |
| Final moisture (%) | 5.7 | 5.7 | 5.6 | 6.8 | 6.8 | 5.5 | 5.2 | 5.5 | 5.5 | 6.2 | — |

As can be gathered from Table 2 above, the inventive coating formulations used in Examples 3A-3G show viscosities within a range of from 280 to 1 950 mPa·s and are thus well suitable for use as coating formulations. The coating formulation used in Example 3H (comparative) has a low viscosity of only 166 mPa·s which may negatively affect the coating performance and coating results. The coating formulation characterized in Example 3I (comparative) shows a high viscosity although the solids contents is comparably low which may also affect the coating performance.

Example 4—Printing Trials

The papers produced according to Examples 3A-3H were printed on HP Envy 5540 using original HP pigment based ink cartridges at a resolution of 4 800×1 200 dpi. The reference paper used for comparison was Zweckform Inkjet 2578.

Ink Density

The ink density measurements of Examples 4A-4H (printed papers of Examples 3A-3H) are summarized in Table 3 hereinbelow.

|  | Ref. | Ex. 4A | Ex. 4B | Ex. 4C | Ex. 4D (comp) | Ex. 4E (comp) | Ex. 4F (comp) | Ex. 4G (comp) | Ex. 4H (comp.) |
|---|---|---|---|---|---|---|---|---|---|
| Paper | Inkjet 2578 | Ex. 3A | Ex. 3B | Ex. 3C | Ex. 3D (comp) | Ex. 3E (comp) | Ex. 3F (comp) | Ex. 3G (comp) | Ex. 3H (comp.) |
| Cyan | 1.11 | 0.94 | 0.90 | 0.91 | 1.10 | 1.04 | 1.08 | 0.78 | 0.96 |
| Magenta | 1.29 | 1.31 | 0.78 | 0.80 | 1.05 | 0.91 | 1.26 | 0.78 | 0.90 |
| Yellow | 1.33 | 1.18 | 0.78 | 0.79 | 1.04 | 0.87 | 1.22 | 0.72 | 0.81 |
| Black | 1.45 | 1.30 | 1.69 | 1.56 | 1.84 | 1.93 | 1.26 | 1.39 | 1.66 |

Printing Results

Some printing results are shown in FIG. 2a-2d at 200× magnification. Compared to the printed reference paper (FIG. 2a), the papers printed in Example 4E (FIG. 2b) and Example 4F (FIG. 2c) showed a higher ink fixation capacity.

Figure 2A:
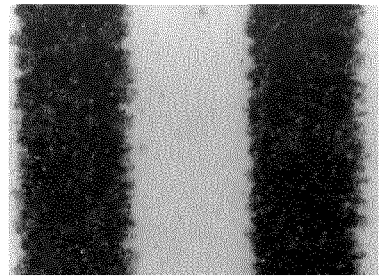
FIG. 2a: Printed reference paper.
Figure 2B:
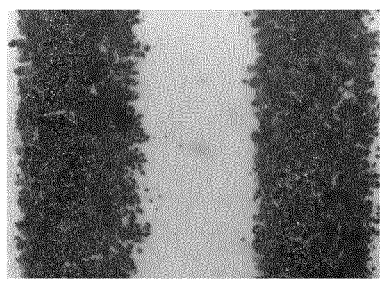
FIG. 2b: Printed paper of Example 4E.
Figure 2C:
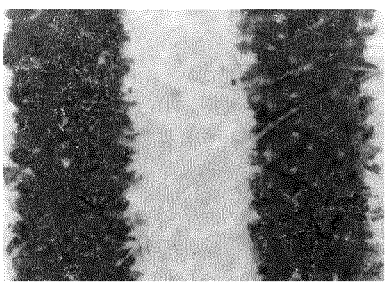
FIG. 2c: Printed paper of Example 4F.
Figure 2D:
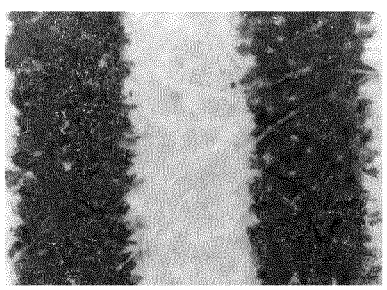
FIG. 2d: Printed paper of Example 4A.

The paper in Example 4A was made from uncoated paper and the coating did not contain a calcium carbonate pigment. The ink density (FIG. 2d) was still comparable to the reference paper (FIG. 2a).

Example 5—Comparison Test

The paper substrate used in this example was Paper 1. The coating compositions were prepared according to the procedures described above. Thus, for the precoating formulation, to calcium carbonate 1 was added Litex PX 9460. The solution was stirred at room temperature and Rheocarb™ 121 was added. The mixture was stirred for 15 min at room temperature. For the preparation of the respective compositions, polyvinyl alcohol (BF-04) was in a first phase dissolved in water at 90° C. for 30 min using a HB4 basic and Eurostar (1 000 rpm) from IKA Labortechnik. The solubilized polyvinyl alcohol was added subsequently to calcium carbonate 3. Sodium NTA or Sodium EDTA was added under stirring. Finally, CaCl₂ solution was added and the solution was stirred at room temperature for 15 min before using it in the coating machine.

TABLE 4

Coating formulations (pigment-based coatings)

|  |  | Recipes | | |
|---|---|---|---|---|
| Components | Solid content | Precoating (parts by weight) | 5A (parts by weight) | 5B (comp) (parts by weight) |
| Calcium carbonate 1 | 71.7 | 100.0 | | |
| Litex PX 9460 | 50.0 | 10.0 | | |
| Rheocarb 121 | 24.0 | 0.5 | | |
| Calcium carbonate 3 | 60.0 | | 100.0 | 100.0 |
| PVA BF-04 | 25.0 | | 6.0 | 6.0 |
| Sodium NTA | 40.0 | | 5.65 | |
| Sodium EDTA | 40.0 | | | 5.68 |
| CaCl2 | 35.0 | | 3.21 | 1.57 |
| Solid content | | 68.3 | 53.7 | 53.5 |
| Viscosity @ 100 rpm | | 1860 | 2680 | 180 |
| pH | | 8.5 | 9.0 | 8.9 |

TABLE 4-continued

Coating formulations (pigment-based coatings)

|  |  | Recipes | | |
|---|---|---|---|---|
| Components | Solid content | Precoating (parts by weight) | 5A (parts by weight) | 5B (comp) (parts by weight) |
| Temperature (° C.) | | 27 | 28 | 29 |
| Coater speed (m/min) | | 20 | 20 | 20 |
| Blade thickness (mm) | | 0.30 | 0.30 | 0.30 |
| Blade load (bar) | | 1.25 | 1.10 | 1.00 |
| Beam angle (°) | | 20 | 20 | 20 |
| Coating weight (g/m²) | | 10.7 | 10.5 | 9.6 |
| Final moisture (%) | | 5.5 | 6.3 | 6.2 |

The ink density of the corresponding coatings was analyzed with a SpectroDens from the company Techkon GmbH as described above. The results are shown in table 5 below.

TABLE 5

|         | Base paper | Precoating | V5A  | V58 (comp) |
|---------|------------|------------|------|------------|
| Cyan    | 1.17       | 0.80       | 0.95 | 0.92       |
| Magenta | 1.44       | 0.68       | 0.88 | 0.89       |
| Yellow  | 1.42       | 0.71       | 0.82 | 0.78       |
| Black   | 1.56       | 1.94       | 1.79 | 1.71       |

It becomes evident that the coating formulation containing the NTA-ligand provides better ink intensities than the corresponding formulation containing EDTA.

The invention claimed is:

1. A coating formulation for digital printing media comprising a polymeric binder and a solid metal complex having a solubility in water of less than 25 g/l at 23° C. determined according to ISO 787-3:2000, said solid metal complex comprising:
   (i) a divalent or trivalent metal cation; and
   (ii) a polydentate ligand;
   characterized in that the polydentate ligand is a molecule of general Formula I or a corresponding anion:

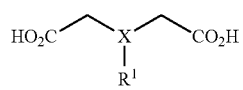

wherein
   X is N, C—H or C—OH; and
   $R^1$ is selected from —$CO_2H$ or —$CH(R^2)CO_2H$, wherein $R^2$ is H or a substituted or unsubstituted alkyl.

2. The coating formulation according to claim 1, characterized in that the solid metal complex has an ISO brightness R457(%) of at least 80.

3. The coating formulation according to claim 1, characterized in that the coating formulation is a coating formulation for inkjet printing media or flexographic printing media.

4. The coating formulation according to claim 1, characterized in that the solid metal complex is obtainable by a process comprising the following steps:
   (4-a) providing a metal salt comprising said divalent or trivalent metal cation and a counter anion;
   (4-b) providing said polydentate ligand;
   (4-c) contacting the metal salt provided in step (4-a) and the polydentate ligand provided in step (4-b) to obtain a mixture;
   (4-d) precipitating the solid metal complex from the mixture obtained in step (4-c);
   wherein said metal salt provided in step (4-a) and/or said polydentate ligand provided in step (4-b) is/are optionally provided in the form of an aqueous preparation.

5. The coating formulation according to claim 4, characterized in that the process defined in claim 4 further comprises a step of increasing the pH value of the mixture obtained in step (4-c) by adding a base.

6. The coating formulation according to claim 1, characterized in that the metal cation is a divalent metal cation.

7. The coating formulation according to claim 1, characterized in that the metal cation of the solid metal complex is selected from the group consisting of $Al^{3+}$, $Ba^{2+}$, $Cr^{3+}$, $Ca^{2+}$, $Cd^{2+}$, $Fe^{3+}$, $Mg^{2+}$, $Pb^{2+}$, $Sr^{2+}$, $Zn^{2+}$, and $Zr^{2+}$.

8. The coating formulation according to claim 1, characterized in that the polymeric binder is selected from the group consisting of starch, modified starch, modified cellulose, proteins synthetic polymers carboxymethyl cellulose, casein, a styrene-butadiene-based copolymer, and polyvinyl alcohol.

9. The coating formulation according to claim 1, characterized in that the formulation has a Brookfield viscosity in the range of from 250 to 5000 mPa·s.

10. The coating formulation according to claim 1, characterized in that the formulation has the following composition, based on the total solids content of the formulation:
   0.1 to 60 wt % of the solid metal complex;
   0.1 to 60 wt % of the polymeric binder;
   optionally 0.01 to 10 wt % of one or more additives;
   wherein the solid metal complex, the polymeric binder and the additives add up to 100 wt %, based on the total solids content of the formulation.

11. The coating formulation according to claim 1, characterized in that the formulation further comprises an inorganic pigment or a calcium carbonate-containing pigment.

12. The coating formulation according to claim 11, characterized in that the formulation has the following relative composition:
   100 parts by weight of inorganic pigment;
   0.1 to 30 parts by weight of the solid metal complex;
   0.1 to 20 parts by weight of the polymeric binder;
   optionally 0.001 to 20 parts by weight of one or more additives.

13. The coating formulation according to claim 1, characterized in that the coating formulation has a total solids content in the range of from 25 to 85 wt %, based on the total weight of the coating formulation.

14. A method for preparing a coating formulation for digital printing media, the method comprising the following steps:
   (14-a) providing a polymeric binder;
   (14-b) providing a solid metal complex having a solubility in water of less than 25 g/l at 23° C. determined according to ISO 787-3:2000, said solid metal complex comprising:
      (i) a divalent or trivalent metal cation; and
      (ii) a polydentate ligand;
   (14-c) mixing the polymeric binder provided in step (14-a) with the solid metal complex provided in step (14-b) and, optionally, with an inorganic pigment;
   characterized in that the polydentate ligand is a molecule of general Formula I or a corresponding anion:

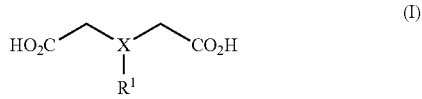

wherein
   X is N, C—H or C—OH; and
   $R^1$ is selected from —$CO_2H$ or —$CH(R^2)CO_2H$, wherein $R^2$ is H or a substituted or unsubstituted alkyl.

15. The method according to claim 14, characterized in that the solid metal complex has an ISO brightness R457(%) of at least 80.

16. The method according to claim 14, characterized in that the method further comprises the following process for preparing the solid metal complex provided in step (14-b):
   (16-a) providing a metal salt comprising said divalent or trivalent metal cation and a counter anion;
   (16-b) providing said polydentate ligand;

(16-c) contacting the metal salt provided in step (16-a) and the polydentate ligand provided in step (16-b) to obtain a mixture;

(16-d) precipitating the solid metal complex from the mixture obtained in step (16-c);

wherein said metal salt provided in step (16-a) and/or said polydentate ligand provided in step (16-b) is/are optionally provided in the form of an aqueous preparation.

17. The method according to claim 16, characterized in that the metal salt provided in step (16-a) is a water-soluble metal salt.

18. The method according to claim 16, characterized in that the counter anion of the metal salt provided in step (16-a) is a monovalent or divalent anion.

19. The method according to claim 16, characterized in that the process for preparing the solid metal complex defined in claim 16 further comprises a step of increasing the pH value of the mixture obtained in step (16-c) by adding a base.

20. The method according to claim 16, characterized in that the process for preparing the solid metal complex defined in claim 16 further comprises a step of drying the solid metal complex obtained in precipitating step (16-d).

21. The method according to claim 16, characterized in that the process for preparing the solid metal complex defined in claim 16 further comprises a step of grinding the solid metal complex obtained in precipitating step (16-d).

22. A method for preparing a digital printing medium, the method comprising the following steps:

(22-a) providing a printable substrate having at least one printable surface;

(22-b) providing a coating formulation as defined in claim 1;

(22-c) applying the coating formulation provided in step (22-b) onto said at least one printable surface of the printable substrate provided in step (22-a).

23. The method according to claim 22, characterized in that the coating formulation is applied onto said at least one printable surface by using a blade coater, a curtain coater, a rod coater or a size press.

24. The method according to claim 22, characterized in that the printable substrate is a precoated or uncoated cardboard substrate, a precoated or uncoated paper substrate, a polymer substrate, a textile-based substrate or a wooden substrate.

25. A digital printing medium obtainable by the method according to claim 22.

26. A digital printing medium according to claim 25 which is suitable for use in digitally printed paper products, digitally printed cardboard products, stickers, labels, tags, tickets, posters, wallpapers, documents, passports, identification cards, banknotes, postage stamps, digitally printed textile products, garments or curtains.

* * * * *